(12) United States Patent
Martell et al.

(10) Patent No.: US 8,831,563 B2
(45) Date of Patent: Sep. 9, 2014

(54) PROVIDING A SERVICE WITH LOCATION-BASED AUTHORIZATION

(75) Inventors: Lawrence Robert Martell, Huntington, NY (US); Brett Henriksen, Greenlawn, NY (US); Michael Lariccio, Bellport, NY (US); Brian Sweeney, Oyster Bay, NY (US)

(73) Assignee: CSC Holdings, LLC, Bethpage, NY (US)

( * ) Notice: Subject to any disclaimer, the term of this patent is extended or adjusted under 35 U.S.C. 154(b) by 252 days.

(21) Appl. No.: 13/021,433

(22) Filed: Feb. 4, 2011

(65) Prior Publication Data

US 2012/0202459 A1    Aug. 9, 2012

(51) Int. Cl.
| | |
|---|---|
| *H04M 1/66* | (2006.01) |
| *H04M 3/00* | (2006.01) |
| *H04W 4/00* | (2009.01) |
| *H04W 24/00* | (2009.01) |
| *H04B 7/00* | (2006.01) |
| *H04B 1/38* | (2006.01) |

(52) U.S. Cl.
USPC ........ 455/410; 455/411; 455/418; 455/432.3; 455/456.3; 455/500; 455/567

(58) Field of Classification Search
USPC ............... 455/41.2, 410–411, 415, 418–420, 455/427–431, 432.1–432.3, 433–434, 455/435.1–435.2, 445, 456.1–456.3, 455/456.5–456.6, 457, 466, 514, 550.1, 455/556.1–556.2, 557, 560–561, 3.06, 66.1, 455/500; 370/310, 312–313, 349, 389, 370/392–393, 395.3, 395.5, 395.52, 395.54, 370/432, 328–329, 338, 341; 711/202–207, 711/216–218, 220–221; 709/218–219, 231, 709/226, 229, 244, 224; 705/51–53, 64, 705/70–78, 14.4, 14.47, 14.64, 14.66; 348/14.01–14.04, 14.16; 707/781–788; 380/241, 270–271

See application file for complete search history.

(56) References Cited

U.S. PATENT DOCUMENTS

| | | | | |
|---|---|---|---|---|
| 7,006,831 | B2 * | 2/2006 | Matz et al. | 455/453 |
| 7,054,642 | B1 * | 5/2006 | Matz et al. | 455/453 |
| 7,647,164 | B2 * | 1/2010 | Reeves | 701/516 |
| 8,260,239 | B2 * | 9/2012 | Moton et al. | 455/234.1 |
| 2004/0029567 | A1 * | 2/2004 | Timmins et al. | 455/412.1 |
| 2005/0097549 | A1 * | 5/2005 | Chu et al. | 717/178 |
| 2006/0142018 | A1 * | 6/2006 | Matz et al. | 455/452.2 |
| 2007/0030973 | A1 * | 2/2007 | Mikan | 380/270 |
| 2010/0135201 | A1 * | 6/2010 | Lewis et al. | 370/328 |
| 2010/0280920 | A1 * | 11/2010 | Scott et al. | 705/27 |
| 2010/0298026 | A1 * | 11/2010 | Goodman | 455/552.1 |
| 2011/0131325 | A1 * | 6/2011 | Piccionelli et al. | 709/225 |
| 2011/0167440 | A1 * | 7/2011 | Greenfield | 725/25 |
| 2011/0173674 | A1 * | 7/2011 | Thomson et al. | 726/1 |

* cited by examiner

*Primary Examiner* — Meless Zewdu
(74) *Attorney, Agent, or Firm* — Sterne, Kessler, Goldstein & Fox, PLLC

(57) ABSTRACT

Methods and systems for providing a service are provided. A request is received to provide the service to a device. A location of the device, or a network interface through which the device is coupled, is determined. Finally, the delivery of the service is authorized based on the determined location of the device, or the determined network interface.

66 Claims, 5 Drawing Sheets

PROVIDING A SERVICE WITH LOCATION-BASED AUTHORIZATION

BACKGROUND OF THE INVENTION

1. Field of the Invention

The present invention is generally related to the authorized delivery of services, and specifically to location-based authorization of service delivery.

2. Related Art

As portable electronic devices become more powerful and popular, consumer demand to have valuable services delivered to these devices has increased. Modern smart phones, tablet computers, laptop computers and portable media devices are all capable of the display of different valuable service offerings without a fixed location. Even traditionally "non-portable" devices, such as desktop computers, are becoming so small that the likelihood of them remaining in a particular location has decreased.

With modern, complex licensing schemes applied to service providers, many desired services have limits upon the locations to which they may be properly delivered. Applied to a service provider, a popular motion picture can have delivery restrictions that mandate delivery only to a private household. Other location-based restrictions can also be applied to licensees.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention.

Figure 1:
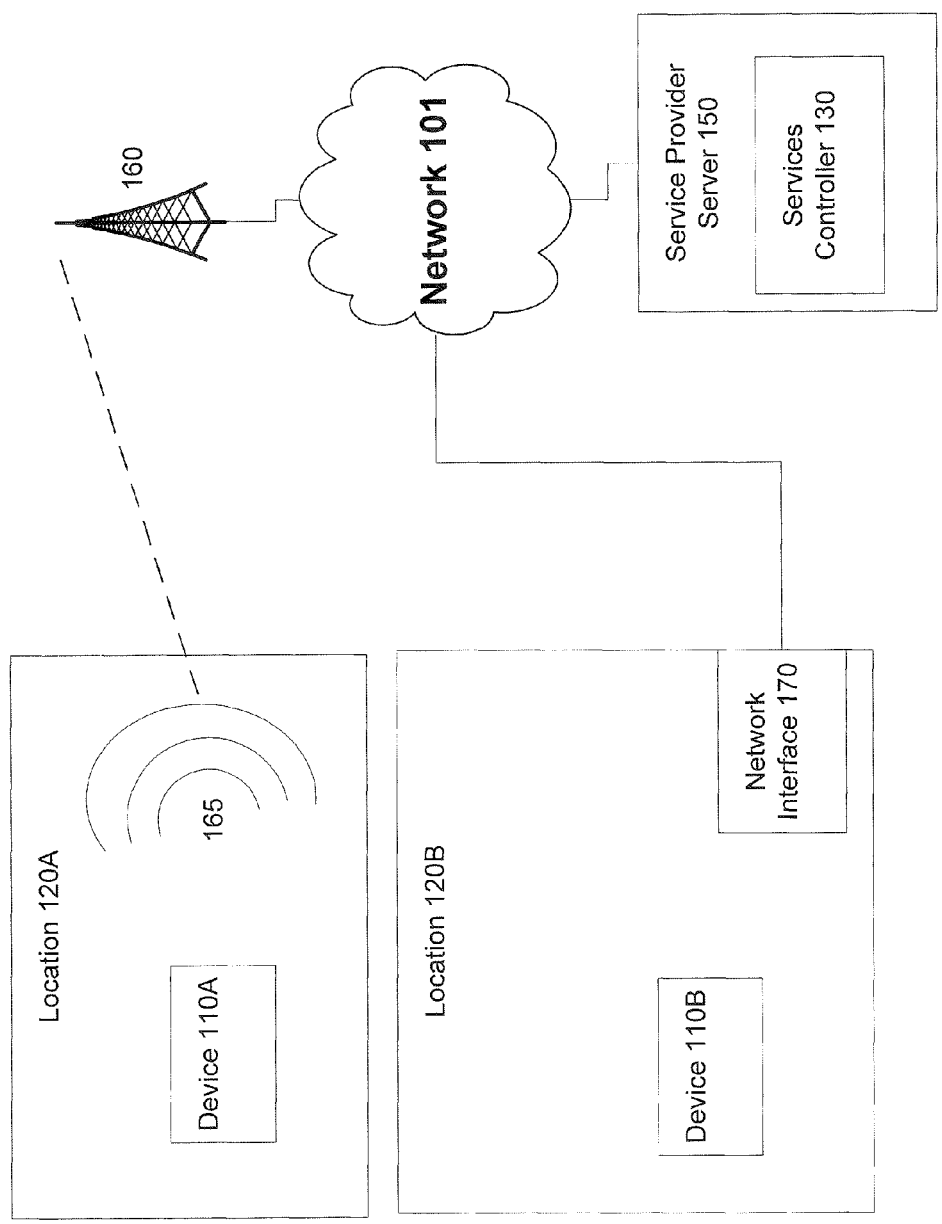
FIG. 1 is a high level block diagram of a system of providing a service to devices in multiple locations, in accordance with embodiments of the present invention.

The features and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

Overview

FIG. 1 shows an example network application architecture 100 in which embodiments of the present invention, or portions thereof, may be implemented. Architecture 100 includes locations 120A-B, wireless base station 160, network 101 and service provider server 150. Locations 120A-B include devices 110A-B respectively. Location 120A further includes wireless signal 165, such signal coupling device 110A to network 101 via wireless base station 160, and location 120B further includes network interface 170 that couples device 110B to network 101. Service provider server 150 is coupled to network 101 and includes services controller 130. As used herein, the term "network interface" may refer to a network interface device, such as a cable modem, a router, or a wireless basestation, or to a network interface component within a device, such as an Ethernet network interface card (NIC), or a WiFi interface. As used herein, the term "location" refers to a localized area, for example: a household, a portion of a building, a building, a city block or other similar local areas.

Traditionally, users seeking to have services provided have been authenticated and authorized via credentials including, for example, username and password, or by possession of an authorized device, such as a cell phone with a specific EIN or a provided set-top box. Under modern licensing schemes, simply being an authenticated subscriber—cannot always provide sufficient authorization to receive certain services. In an embodiment, an additional authorization condition verifies that an authenticated user is consuming a service in a particular location.

An embodiment described herein relates to providing a service to a user that is using a device in a particular location, for example device 110A operating in location 120A. A request is received at service provider server 150 and services controller 130 determines that device 110A is in location 120A. In another embodiment, services controller receives the determined location for device 110A from a different source. If services controller 130 determines that location 120A is an authorized location for device 110A to receive the requested service, then the requested service is provided to device 110A via service provider server 150, wireless base station 160 and wireless signal 165. An example of an authorized location is a household location associated with a subscriber who is registered as having device 110A. Similarly, if services controller 130 determines that location 120A is not an authorized location for device 110A to receive the requested service, then the requested service is not provided to device 110A.

In a more detailed example, a request to provide a service is received at service provider server 150 from device 110B via network interface 170. In this example, services controller 130 is further configured to determine the location of device 110B based on the received request. One approach taken by services controller 130 relies upon an established relationship between network interface 170 and location 120B. Based on this relationship, services controller 130 determines that device 110B is at location 120B. In another embodiment, the relationship between network interface 170 and location 120B is established by a determination, using other means, that network interface 170 is in location 120B. An example of service authorization based on different approaches to determining the location of a subscriber is described in U.S. patent application Ser. No. 12/652,463, filed Jan. 5, 2010, entitled "Enhanced Subscriber Authentication Using Location Tracking" (hereinafter "Subscriber Tracking Application"), which is incorporated herein by reference in its entirety.

A non-limiting, list of example services provided by services provider server 150 includes delivery of any type of media content, for example audio and video content. In different embodiments, such media content can be streamed or delivered completely to devices 110A-B. In another embodiment, an example service includes a software application executed by both service provider server 150 and device 110A, e.g., a game or productivity application. As would be appreciated by one having skill in the relevant art(s), given the description herein, any type of service where the delivery location requires restriction and that can be provided to devices 110A-B, could benefit from embodiments described herein.

Figure 2:
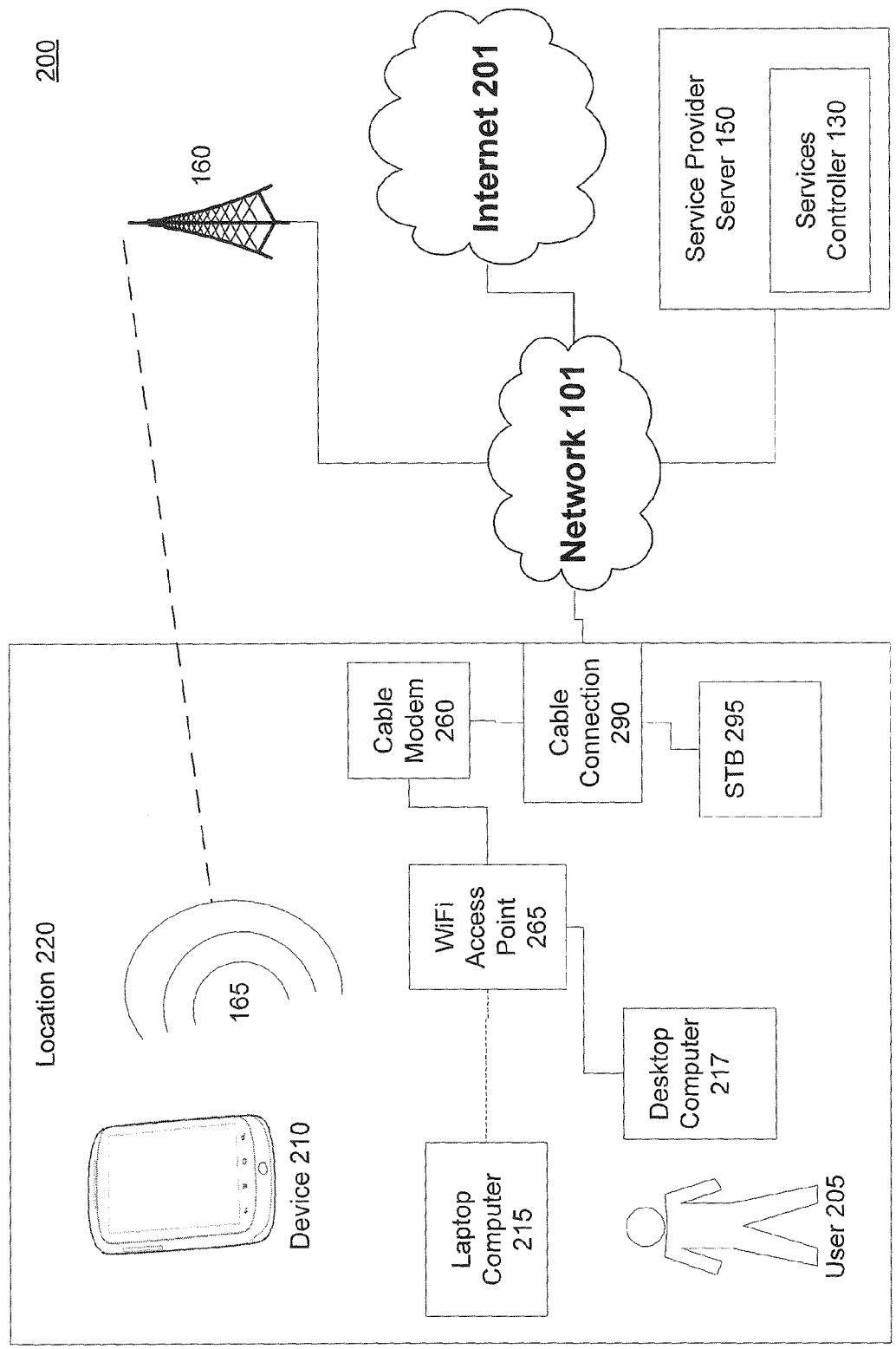
FIG. 2 is a more detailed block diagram of providing a service to multiple devices in a location, in accordance with embodiments of the present invention.

FIG. 2 shows a more detailed view of example network application architecture 200, according to an embodiment. Network application architecture 200 includes location 220, wireless base station 160, network 101 and Internet 201. Location 220 is a geographic location that includes user 205, device 210, wireless signal 165 laptop computer 215, desktop computer 217, WiFi access point 265, cable connection 290, set-top box (STB) 295 and cable modem 260.

WiFi access point 265 is wirelessly coupled to laptop computer 215 (shown by a dotted line) and is coupled using a wired connection to desktop computer 217. Though WiFi access point 265 has wireless connectivity capacity, concepts discussed herein that are applicable to this component can apply to other similar types of network interface devices, e.g., routers and switches. Cable modem 260 is coupled to WiFi access point 265 and cable connection 290. Cable connection 290 is coupled using a wired connection to STB 295 and service provider server 150 via network 101. In an embodiment, network 101 is a proprietary network managed by the service provider, such network coupled both to service provider server 150 and Internet 201. In alternate embodiment, service provider 150 is coupled to network 101 via Internet 201 (not shown). Location 220 further includes wireless signal 165, such signal coupling device 210 to network 101 via wireless base station 160.

According to an exemplary embodiment, user 205 is a subscriber to services provided by service provider server 150. Typically, as used herein, user 205 generally refers to a human individual, but user 205 could collectively refer to a group of people, e.g., a family, or an organization. The "user" concepts described herein can also be applied to the devices themselves as "users" of provided services. Users and user information are discussed further with the description of FIG. 3 below.

Service Request

As described above, in different embodiments, different devices 110A-B can be used to receive a service provided by service provider server 150. One approach to initiating the process of delivering a service to a device involves a service request being generated from the device to which the service is to be delivered. In another embodiment, the service request can be generated from another source, and specify the destination device. Because authentication by some embodiments is dependent upon present characteristics (e.g., the geographic location) of a device, having the request for a service originate from the device has extra benefits. As discussed further below, significant amounts of location information can be determined by analyzing the connections used by a device to make a service request.

The service request, and the connections through which the request is made, can include a broad range of information about both the requesting user and the device to which the service is to be delivered. In an embodiment, the service request is received by a tracker in services controller 130, and has user information and/or device information as described further with the description of FIG. 3 below.

The following illustrative list of information items R1-R6 can be included alone or in any combination with the service request. Some items R1-R6 can be derived by analyzing aspects of the service request. Additionally, some of items R1-R6 can be requested by service provider server 150 in response to the receipt of a service request. Items R1-R6 are listed below:

R1. User Identifier: For example, in making a service request the user identifier can be a user name and/or password needed to access a user subscriber account. A user identifier can also be included in identification stored on device 110A, e.g., a user certificate, a token stored in memory or a web cookie stored in a browser. In addition, a user identifier may be determined, indirectly, via associations with other provided information items such as R2-R6, below.

R2. Device Identifier: Modern electronic devices can include a variety of indentifying information that can be linked to other aspects described herein, e.g., the requesting user. For example, when making a service request, an identifying piece of information (device identifier) can be a MAC address assigned to a network interface within the originating device. Alternatively, instead of being sent with the service request, in an embodiment, a device identifier may be queried and retrieved by the service provider from the device rather than being sent in the service request. For example, wireless base station 160 may obtain the device MAC address when establishing a wireless connection with the devices. In another approach, services controller 130 can obtain the device MAC address from a dynamic host configuration protocol (DHCP) component that assigns an IP address to the device. A device may also be identified by a token, a web cookie or a device certificate.

R3. Network Interface Information: The network interface to which a requesting device is coupled can provide significant information about the location of the device. Network interfaces such as WiFi access points, cable modems, and wireless base station 160 can have identifiers that are linked to a location 120A and/or a requesting user. Using this approach, the service request does not contain identification information about the user and/or the device to which the service is to be delivered. Linking a device with a location can be based entirely upon information associated with the network interface 170 through which the service request is sent. Examples include: device 210 linked to location 220 by wireless base station 160, laptop computer 215 and desktop computer 217 linked to location 220 by WiFi access point 265 and cable modem 260. Further description of linking a network interface to a location and a user is provided below with the description of FIG. 3.

R4. Network Connection Information. In another approach, a requesting device connects via a network that uses identification information to facilitate the connection. For example, devices connecting over Internet 201 have an IP address that can be associated with a device and/or a location. Thus when laptop computer 215 connects service provider server 150 via WiFi access point 265, cable modem 260, network 101 and Internet 201, at each point in the connection path, an IP address is utilized. In an embodiment, the connected devices (e.g., laptop computer 215 and desktop computer 217) are on a private network in the home and their IP addresses are not visible to services controller 130. In an example, because it is coupled to a service provider managed element (cable modem 260), the IP address of WiFi access point 265 is visible to elements outside of the in-home private network, such as services controller 130, for connections with the connected devices. Devices coupled to WiFi access point 265—laptop computer 215 and desktop computer 217—may have individual IP addresses that are not visible outside their private network, but their connection through WiFi access point 265 relays useful information to services controller 130.

R5. GPS Information: Many modern devices can have the capability of using GPS signals to approximate a geographical location. A service request can include this GPS information in the request, or such information can be provided by device 210 to service provider server 150 upon request.

R6. Wireless Signal Information: Devices that use wireless signals to connect to network 101 can connect to multiple wireless base stations 160, each base station having a different signal strength and/or timing offset in relation to the device. As discussed below, an embodiment can combine these signal strength and/or timing offset values to triangulate the location of a device.

As would be appreciated by one having skill in the relevant art(s), given the description herein, additional items of information can be included in and/or determined by, service requests. It should be appreciated that information used by embodiments that describes a user, a device and a device location, can be established using a variety of approaches.

Estimating the Location of a Device

Based on the information received from device 210, an embodiment can estimate the geographical location of a device. For example, based on information discussed above, device 210 can be determined to be at location 220. Different approaches can be used to estimate the location of device 210, including approaches that use information items R1-R6 described above, as well as other information. As noted above, additional approaches to device geolocation are described in the Subscriber Tracking Application. As further described with the description of FIG. 3 below, in an embodiment, a locator engine uses the information received from the above-referenced tracker to determine the location of device 210.

A non-limiting list of items L1-L4 listed below illustrates different approaches used by embodiments to determine the location of devices, including device 210, laptop computer 215 and desktop computer 217. While approaches L1-L4 listed below describe a broad variety of different approaches, it should be appreciated that any approach to estimating location can be used by embodiments. Items L1-L4 are listed below:

L1. Wireless Signal Information: As noted with item R6 above for example, requests for services from a device 210 accessed via wireless signal 165 and wireless base station 160 can typically be identified as originating from within a specific service radius associated with wireless base station 160. To improve this accuracy, multiple wireless base stations 160 can be combined to triangulate the location of device 210.

L2. GPS Geolocation: As noted above with item R5, the location of device 210 can be established using GPS geolocation performed by device 210.

L3. Network interface information: As noted above with item R3, network interface information associated with the connection between device 210 and internet 201 can be included with the service request. By linking this network interface information with location 220, the location of device 210 can be established. In an example, location 220 can be linked to WiFi access point 265 by identification information associated with WiFi access point 265. WiFi access point 265, for example, has an associated MAC address that can be stored by service provider server 150 and used to establish the presence of device 210 in location 220. In another example, desktop computer 217 connects to Network 101 and Internet 201 via WiFi access point 265 and cable modem 260, these network interfaces having identification information that can be received with, or determined from, a request and linked to location 220. At services controller 130, cable modem 260 and STB 295 are related to user 205, such user 205 having location 220 as their subscriber household. In another embodiment, a provider using other technologies, such as Digital Subscriber Line (DSL) or Fiber to the Home (FTTH) may use similar techniques, well-known to those skilled in the art, to confirm access from within the subscriber household. Stored subscriber profile information is further discussed with the description of FIG. 3 below.

L4. Network Connection Information: As discussed above with item R4, network connection information can be used to determine the location of a connecting device. For example, when the network connection information is an IP address, well known techniques can be used to establish the general location of connected device 210. As discussed below with the description of FIG. 3, IP addresses can also be stored for a user as a part of a subscriber profile. Having a stored IP address linked to location 220 can allow identification of connected devices.

As would be appreciated by one having skill in the relevant art(s), given the description herein, techniques in addition to approaches L1-L4 listed above can be used to estimate the location of a device. Approaches L1-L4 can be used individually or in any combination to determine the location of devices including, device 210, laptop computer 215 and desktop computer 217. In another embodiment, the techniques described above, and particularly those described in L3 and L4, may be additionally supplemented by measurement of the round trip time between coupled devices (e.g., laptop computer 215 and desktop computer 217) and a service provider managed element (e.g., cable modem 260 or service provider server 150). This round-trip time measurement can ensure that coupled devices are not beyond a particular distance from the service provider managed element.

Services Controller

Figure 3:
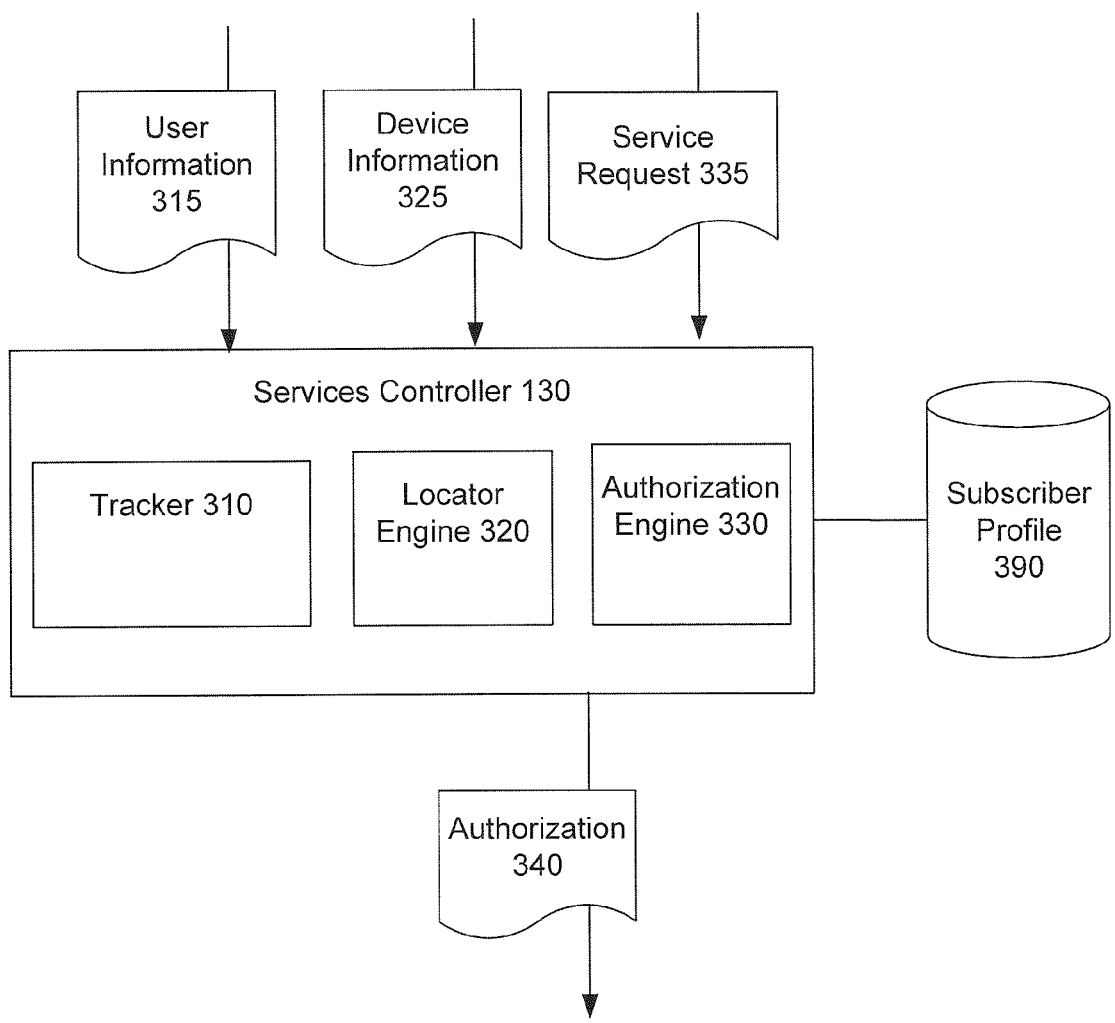
FIG. 3 is a more detailed block diagram of a services controller, in accordance with embodiments of the present invention.

FIG. 3 shows a more detailed view of services controller 130, according to an embodiment. Services controller 130 includes tracker 310, locator engine 320 and authorization engine 330. User information 315, device information 325 and service request 335 are received by services controller 130 and authorization 340 is generated by services controller 130. Services controller is coupled to subscriber profile 390.

In an embodiment, tracker 310 receives service request 335, along with user information 315 and device information 325. Locator engine 320 uses the information received from tracker 310 to determine the location of device 210. For example, locator engine 320 can utilize user information 315 and/or device information 325 to determine that device 210 is present in location 220. As discussed further below, in another embodiment, locator engine 320 compares the received information (315, 325) with information stored in subscriber profile 390. For example, device information 325 can include information about cable modem 260, such network interface having an identifier linked to user 205, for example, by subscriber profile 390. In other embodiments, different approaches to linking information to users, devices and locations can also be used.

Authorization engine 330 is configured to combine received information and determine whether to authorize the providing of the requested service to the requesting device. An exemplary determination is whether the determined location of the requesting device is authorized to receive the service. An additional determination performed by an embodiment concerns whether the requesting user is authorized to receive the service.

For example, after locator engine 320 determines that requesting device 210 is in location 220, authorization engine 330 compares the determined location 220 with authorized locations stored in subscriber profile 390. In another embodiment, a network interface can be presumed to be in an authorized location, and no additional location determination is performed.

User Authentication

In an embodiment, a user is associated with the service request, and this associated user is authenticated as a condition of the delivery of the service. Authentication of the user can be performed in various known ways, including by authenticating user credentials associated with the request. User credentials can include a username and a password, a user certificate, a stored user token and a stored "web cookie," according to different embodiments. A user can also be authenticated by virtue of possessing a registered user device, e.g., user 205 making a service request from device 210.

In an embodiment, in association with service provider server 150, information is stored by a service provider about individuals authorized to receive services, e.g., user 205 as a subscriber. This stored information can be stored as a subscriber "account profile" and/or other collection of information. For convenience, this stored information is referred to herein as a "subscriber profile," e.g., subscriber profile 390.

In an embodiment, a service "user" can be one of several people included in a subscriber account, as well as the subscriber account itself. An example of a group of people who share a single subscriber account is a household, e.g. a group of people living in a single dwelling. In an embodiment, a user can be authorized to receive a service on a device based on their association with a subscriber account. In a similar embodiment, the individuals included in a subscriber account can be authorized based on an association of the subscriber account with a user.

The service provider can authenticate users, devices and/or locations by accessing subscriber profile 390. Subscriber profile 390 may include user identifiers associated with the account of the subscriber, and additional information may or may not be included. In one embodiment, subscriber profile 390 is built by the service provider based on data tracked by the service provider. For example, after the service provider has received information about a device and/or a user, the service provider may track the information.

Upon receipt of a service request, services controller 130 can determine if the user associated with the user identifier, or device associated with the device identifier, corresponds to an entry in subscriber profile 390. Subscriber profile 390 can also be used to establish a location for service requesting device 210. Once the location is established, subscriber profile 390 can be used to authorize the providing of the service based on locations associated with user 205.

In an embodiment, subscriber profile 390 may contain a broad variety of information, including a list of users and/or devices associated with the subscriber account and rules and/or exceptions for service access for each user, device, group of users, or group of devices in the subscriber household.

In different embodiments, subscriber profile 390, as well as all other items information discussed herein, can be stored in, and retrieved from, a database, a directory, a file, a table or other appropriate physical or logical data structure, for example, as records.

In the following non-limiting, illustrative list, items P1-P6 describe example information stored, by embodiments, in subscriber profile 390. Items P1-P6 are listed below:

P1. Subscriber profile 390 can store references to devices associated with particular subscribers. For example, device 210, laptop computer 215 and desktop computer 217 can be related to user 205.

P2. Limitations can be stored in subscriber profile 390 that specify the types of devices with which a subscriber can be authorized to receive services. For example, user 205 can have limitations stored in subscriber profile 390 that do not allow connections to "mobile" devices, e.g., stationary desktop computer 217 is permissible but device 210 is not.

P3. Limitations can be stored in subscriber profile 390 that specify the maximum number of devices can be associated with a user. For example, in an embodiment, user 205 can only use two out of the three devices shown on FIG. 2.

P4. Stored subscriber profile 390 can refer to locations associated with a subscriber. For example, the location of the household associated with user 205 can be stored, e.g., location 220. The location of a subscribing household may be the primary residence of the subscribing household, and the address of the primary residence of a subscriber may be gathered from a subscriber when he or she initially signs up for the service. In the case of a commercial customer, the location of the subscribing household may be the address of the subscriber's business. The subscribing household may be associated with one location or more than one location.

P5. User authentication information can be stored subscriber profile 390, for example a user identifier and a user password. This user identifier may be any number, string, or other identifier associated with a subscriber or subscriber household in a service provider database. In some embodiments, the user identifier may be several identifiers associated with a user account or accounts. In the case of phones, the user identifier may be a phone number assigned to a customer. In the case of cable television service accessed over the internet, the user identifier may be a user name associated with a subscriber household. In one embodiment, the user identifier may be associated with a subscriber account, and this information may be stored in a database accessible by the service provider. For example, the user identifier may be a username, and the service provider may access a database of subscriber accounts and associated usernames. In another embodiment, a subscriber account identifier may be sent with the request, along with the user identifier.

P6. Network interface information associated with a subscriber can also be stored in subscriber profile 390. Such network interface information including identifying information about STB 295 and cable modem 290.

As would be appreciated by one having skill in the relevant art(s), given the description herein, additional information beyond items P1-P6 can be beneficially stored in subscriber profile 390. Information can be accessed and combined using a variety of approaches to enable to authentication and authorization functions of some embodiments described herein.

Service Authentication

In general, location tracking may be incorporated into authentication processes in a variety of ways. For example, the service provider may only permit access to a service if device 210 is present in location 220. User 205, using device 210, can request a service, for example, that is limited to the household location of the user, e.g., location 220. In an embodiment, providing the location-restricted service is only authorized by service provider server 150 after the location of device 210 is determined and matched to authorized location 220. Additional examples of location-based authentication are described in the Subscriber Tracking Application noted with the description of FIG. 1 above.

Continuing this example, during the providing of the location-restricted service, an updated location of device 210 can be periodically checked and continued presence in an authorized location can be verified. In an embodiment, services controller 130 continues to track the location of a device after an initial request by, for example, monitoring the continuing connection to Internet 201. For example, by tracking the ongoing association of laptop computer 215 with WiFi access point 265, the continuing presence of laptop computer 215 at location 220 can be verified. In another embodiment, the service provider continues to track the location of the user after the initial request by monitoring network communication information, for example, by tracking packets to and from device 210 marked with a network address, such as an IP address assigned to device 210 and wireless base station 160. In an embodiment, where a coupled device (e.g., desktop computer 217) is on a private network, with an IP address that is not visible outside the private network, and is coupled to a network interface with a visible IP address (e.g., WiFi access point 265), if the coupled device is moved to another network interface, that change can be noted and and treated as indicative of a change in location. Based on this change of network interface, services controller 130 can terminate service delivery to the coupled device, or require reauthorization.

Method 400

Figure 4:
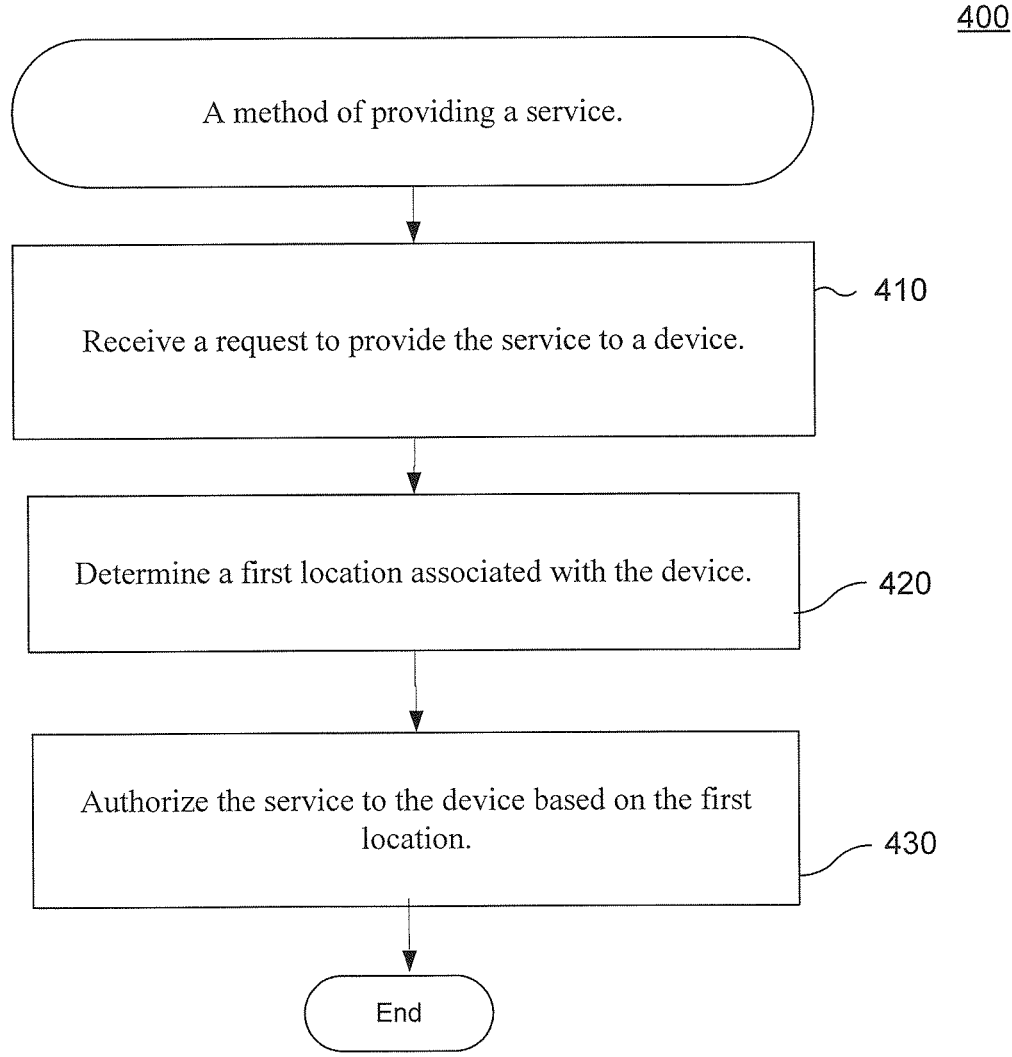
FIG. 4 is a flow diagram illustrating a method of providing a service, in accordance with embodiments of the present invention.

FIG. 4 illustrates a more detailed view of how embodiments described herein may interact with other aspects of embodiments. In this example, a method 400 of providing a service is shown.

Initially, as shown in stage 410 in FIG. 4, a request to provide the service to a device is received For example, in an embodiment, a request for a service, e.g., service request 335, is received at services controller 130 from device 210. After the completion of stage 410, execution proceeds to stage 420.

At stage 420, based on the received information, a location of the device is determined. For example, in an embodiment, based on an IP address associated with service request 335, location 220, is determined. After the completion of stage 420, execution proceeds to stage 430.

At stage 430, providing the service to the device is authorized based on the determined location of the device. For example, in an embodiment, authorization engine 330 in services controller 130 compares determined location 220 to a list of authorized locations for user 205 stored in subscriber profile 390. Having found a match between location 220 and information in subscriber profile 390, authorization engine 330 issues authorization 340 to service provider server 150, such server delivering the service requested by service request 335 to device 210. After stage 430, method 400 ends.

Example Computer System Implementation

Figure 5:
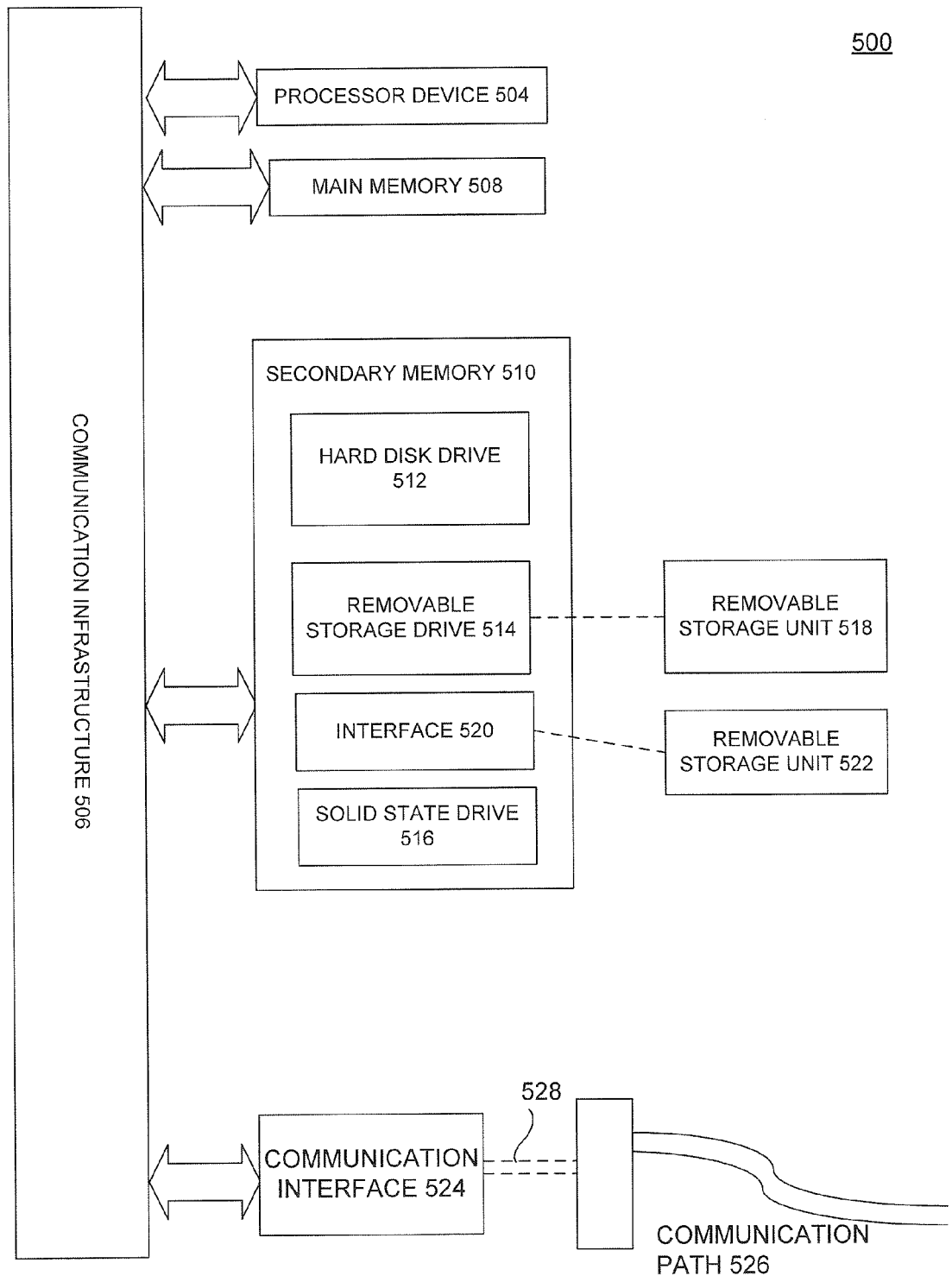
FIG. 5 is a diagram illustrating an exemplary computer system that may be used to implement an embodiment.

FIG. 5 illustrates an example computer system 500 in which embodiments of the present invention, or portions thereof, may be implemented. For example, portions of systems or methods illustrated in FIGS. 1-4 may be implemented in computer system 500 using hardware, software, firmware, tangible computer readable media having instructions stored thereon, or a combination thereof and may be implemented in one or more computer systems or other processing systems. Hardware, software or any combination of such may embody any of the modules/components in FIGS. 1-3 and any stage in FIG. 4. Devices 110A-B, device 210, laptop computer 215, desktop computer 217 and service provider server 150 can also be implemented having components of computer system 500. After reading this description, it will be apparent to a person skilled in the relevant art how to implement the invention using other computer systems and/or computer architectures.

If programmable logic is used, such logic may execute on a commercially available processing platform or a special purpose device. One of ordinary skill in the art may appreciate that embodiments of the disclosed subject matter can be practiced with various computer system and computer-implemented device configurations, including smart phones, cell phones, mobile phones, tablet PCs, multi-core multiprocessor systems, minicomputers, mainframe computers, computer linked or clustered with distributed functions, as well as pervasive or miniature computers that may be embedded into virtually any device.

The computer system 500 includes one or more processors, such as processor device 504. Processor device 504 is connected to communication infrastructure 506. Computer system 500 also includes a main memory 508, preferably random access memory (RAM), and may also include a secondary memory 510. Secondary memory 510 may include, for example, a hard disk drive 512 and/or a removable storage drive 514, representing a floppy disk drive, a magnetic tape drive, an optical disk drive, etc. Removable storage drive 514 reads from and/or writes to a removable storage unit 518 in a well-known manner. Removable storage unit 518, represents a floppy disk, magnetic tape, optical disk, etc., which is read by and written to by removable storage drive 514. As will be appreciated, the removable storage unit 518 includes a computer usable storage medium having stored therein computer software and/or data.

In alternative embodiments, secondary memory 510 may include other similar means for allowing computer programs or other instructions to be loaded into computer system 500. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 that allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a PCMCIA slot and card, a wireless LAN (local area network) interface, etc. Software and data transferred via communications interface 524 are in the form of signals 528 which may be electronic, electromagnetic, optical, or other signals capable of being received by communications interface 524. These signals 528 are provided to communications interface 524 via a communications path (i.e., channel) 526. This channel 526 carries signals 528 and may be implemented using wire or cable, fiber optics, a phone line, a cellular phone link, a wireless link, and other communications channels.

In this document, the term "computer program product" and "computer-readable medium having computer-executable instructions stored thereon" can refer to removable storage units 518, 522, and signals 528. These computer program products are means for providing software to computer system 500. The invention is directed to such computer program products.

Computer programs (also called computer control logic) are stored in main memory 505, and/or secondary memory 510 and/or in computer program products. Computer programs may also be received via communications interface 524. Such computer programs, when executed, enable computer system 500 to perform the features of the present invention as discussed herein. In particular, the computer programs, when executed, enable the processor device 504 to perform the features of the present invention. Accordingly, such computer programs represent controllers of the computer system 500.

In an embodiment where the invention is implemented using software, the software may be stored in a computer readable storage medium and loaded into computer system 500 using removable storage drive 514, hard disk drive 512 or communications interface 524. The control logic (software), when executed by the processor device 504, causes the processor device 504 to perform the functions of the invention as described herein.

In another embodiment, the invention is implemented primarily in hardware using, for example, hardware components such as application specific integrated circuits (ASICs). Implementation of hardware state machine(s) so as to perform the functions described herein will be apparent to persons skilled in the relevant art(s).

In yet another embodiment, the invention is implemented using a combination of both hardware and software.

Members of a household can typically be expected to exhibit certain location-related behaviors, such as regular and extended presence at the service address associated with an account, or regular and extended periods of being in the same location as other members of the household. Consistent with the principles of the present invention as embodied and broadly described herein, the location, history of a human user or user device can be used to validate, or to call into question, whether the user is actually a member of the household associated with a given account.

In an embodiment, a request to access a service is received from a user. This request may be a request to receive services from a service provider or to access services from the service provider. In some embodiments, the request initiates a session with the service provider. In other embodiments, no session is initiated. The request may contain a password and/or identifiers, such as a user device identifier, user identifier, and/or a user account identifier. Alternatively, identifiers may be determined by querying the user device requesting access to the service. User data may be tracked using any of these identifiers, along with information regarding the time the user accessed the service, and/or a location from which the user accessed the service. The tracked user data may be evaluated with respect to a policy to determine if the user identifier or user device should be authorized to access the service. For example, this evaluation may be carried out by determining, if the user identifier or user device has established a minimum periodic presence in a geographic location associated with a subscriber account, such as the home of the subscriber household. In one embodiment, the criteria for determining whether the user identifier or device has established a minimum periodic presence is defined in a policy.

According to another aspect of the invention, a subscriber profile associated with the account identifier may be accessed. This subscriber profile may include location history data for the various identifiers associated with the subscriber account, and a separate process may analyze the historical information in order to determine whether the location history is consistent with use by a member of the account household. If the analysis concludes the location history is not consistent with expectations for an authorized member of the household, the service provider may flag the user identifier or user device as potentially unauthorized. In one embodiment, this flag may be used to automatically prevent further access by the user identifier or user device. In another embodiment, this flag may be used to generate an alert to personnel at the service provider, to investigate the potentially unauthorized access. In yet another embodiment, the flag may be used to automatically generate a warning message to, or to solicit additional information from, the user or subscriber.

CONCLUSION

Embodiments described herein relate to methods and systems and computer program products for providing a service using location-based authentication. The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A method of providing a service, comprising:
   receiving a request to provide the service to a device, wherein the device is associated with a subscriber profile that includes information comprising:
      a list of authorized locations, and
      a maximum number of devices that can be associated with the subscriber profile to access the service;
   determining a first location associated with the device; and
   authorizing the service to the device in response to determining, based on the information in the subscriber profile, that the first location is in the list of authorized locations and that a number of devices accessing the service will not exceed the maximum number of devices.

2. The method of claim 1, wherein the authorizing comprises comparing the first location to a second location.

3. The method of claim 2, wherein the second location is a household location associated with a user.

4. The method of claim 1, further comprising:
   authenticating user credentials associated with the request.

5. The method of claim 1, further comprising:
   identifying the device based on a hardware identifier associated with the device.

6. The method of claim 5, wherein the hardware identifier is a media access control (MAC) address of the device.

7. The method of claim 1, further comprising:
identifying the device by authenticating device credentials associated with the request.

8. The method of claim 1, further comprising:
identifying a user associated with the request based on a record associating the user with the device.

9. The method of claim 1, wherein determining the first location comprises:
determining a network interface through which the device is connected;
determining a second location, wherein the second location is associated with the network interface; and
determining the first location based on the second location.

10. The method of claim 9, wherein determining the network interface comprises determining identification information associated with the network interface.

11. The method of claim 10, wherein the identification information is an internet protocol (IP) address.

12. The method of claim 9, wherein the second location is determined by internet protocol (IP) address geolocation.

13. The method of claim 10, wherein the identification information is a media access control (MAC) address.

14. The method of claim 9, wherein the second location is determined based on a record associating the second location with the MAC address.

15. The method of claim 9, wherein the network interface is one of a WiFi access point, a router, a cable modem, or a wireless base station.

16. The method of claim 1, wherein the first location is determined based on a global positioning system (GPS) measurement.

17. The method of claim 1, wherein the first location is determined based on triangulation from multiple network interfaces.

18. The method of claim 1, wherein the device is one of a portable media player, a personal computer, a tablet computer, an internet-connected television, a game console, or an optical disc player.

19. The method of claim 1, further comprising:
providing the service to the device;
determining an updated location associated with the device; and
authorizing continued service to the device based on the updated location of the device.

20. The method of claim 1, further comprising:
comparing the first location with the authorized locations in the subscriber profile.

21. The method of claim 1, wherein authorizing the service to the device further comprises:
authorizing the service to the device in response to determining that the first location matches an authorized location in the list of authorized locations.

22. The method of claim 1, wherein the subscriber profile further includes a list of a plurality of devices associated with the subscriber profile that can be used to access the service.

23. The method of claim 1, wherein the subscriber profile further includes a list of authorized device types.

24. The method of claim 23, wherein the subscriber profile further includes a maximum number of the authorized device types that can be used to access the service, and wherein the maximum number is greater than one.

25. The method of claim 1, wherein the subscriber profile further includes network interface information.

26. The method of claim 25, wherein the network interface information includes identifying a set top box and a cable modem associated with the subscriber profile.

27. The method of claim 1, wherein the device is coupled to a first network interface, and wherein the method further comprises:
detecting a coupling of the device to a second network interface.

28. The method of claim 1, wherein the service is a cable television service.

29. The method of claim 1, wherein the subscriber profile is associated with an account of a subscriber.

30. The method of claim 29, wherein the account is associated with a subscriber household.

31. The method of claim 30, wherein the subscriber profile identifies members of the subscriber household that are authorized to access the service.

32. The method of claim 30, wherein the first location is a location of a primary residence of the subscriber household.

33. A method of providing a service, comprising:
receiving a request to provide the service to a device, wherein the device is associated with a subscriber profile that includes information comprising:
a list of authorized locations, and
a maximum number of devices that can be with the subscriber profile to access the service;
determining identification information associated with a network interface through which the device is connected; and
authorizing the service to the device based on the identification information and the information in the subscriber profile, in response to determining that a first location associated with the device is in the list of authorized locations and that a number of devices accessing the service will not exceed the maximum number of devices.

34. The method of claim 33, wherein the identification information is a media access control (MAC) address.

35. The method of claim 33, further comprising:
determining a first user associated with the network interface device; and
determining a second user associated with the request, wherein the authorizing is further based on comparing information associated with the first user with information associated with the second user.

36. The method of claim 35, wherein the first user is a subscriber account, the second user is an individual user, and the first user is determined to match the second user if the second user is associated with the first user.

37. The method of claim 35, wherein the first user is an individual user, the second user is a subscriber account, and the first user is determined to match the second user if the first user is associated with the second user.

38. The method of claim 33, further comprising:
determining a first location associated with the device; and
determining, based on the information in the subscriber profile, that the device is authorized to access the service at the first location.

39. The method of claim 33, further comprising:
determining, based on the information in the subscriber profile, that the device is authorized to access the service from the network interface.

40. The method of claim 33, further comprising:
detecting a coupling of the device to a second network interface; and determining, based on the information in the subscriber profile, that the device is authorized to access the service from the second network interface.

41. A computer-based system for providing a service to a device comprising:
  a memory storing a subscriber profile, wherein the subscriber profile includes a plurality of limitations for providing the service, the plurality of limitations comprising:
    a plurality of devices corresponding to the subscriber profile,
    a maximum number of the plurality of devices that can be used to access the service, wherein the maximum number is greater than one, and
    a list of authorized locations corresponding to the subscriber profile;
  a tracker configured to receive a request to access the service;
  a locator engine configured to determine a first location associated with the device; and
  an authorization engine configured to authorize the providing of the service in response to determining, based on the information in the subscriber profile, that the first location is in the list of authorized locations and that a number of devices accessing the service will not exceed the maximum number of the plurality devices.

42. The computer-based system of claim 41, wherein the authorization engine is further configured to compare the first location to a second location.

43. The computer-based system of claim 42, wherein the tracker is further configured to determine a user associated with the request, and wherein the second location is a location associated with the user.

44. The computer-based system of claim 43, wherein the second location is a household location associated with the user.

45. The computer-based system of claim 43, wherein the tracker is further configured to determine the user by authenticating user credentials associated with the request.

46. The computer-based system of claim 41, wherein the tracker is further configured to identify the device based on a hardware identifier associated with the device.

47. The computer-based system of claim 46, wherein the hardware identifier is a media access control (MAC) address of the device.

48. The computer-based system of claim 46, wherein the tracker is further configured to authenticate device credentials associated with the request.

49. The computer-based system of claim 48, wherein the device credentials comprise at least one of a token, a web cookie and a device certificate.

50. The computer-based system of claim 43, wherein the tracker is configured to determine the user based on a record associating the user with the device.

51. The computer-based system of claim 41, wherein the locator engine is further configured to:
  determine a network interface through which the device is connected;
  determine a second location associated with the network interface; and
  determine the second location to be the first location.

52. The computer-based system of claim 51, wherein the locator engine is further configured to:
  determine identification information associated with the network interface.

53. The computer-based system of claim 52, wherein the identification information is an internet protocol (IP) address.

54. The computer-based system of claim 51, wherein the locator engine is configured to use IP address geolocation to determine the second location.

55. The computer-based system of claim 52, wherein the identification information is a media access control (MAC) address.

56. The computer-based system of claim 51, wherein the locator engine is configured to determine the second location based on a record associating the second location with the MAC address.

57. The computer-based system of claim 51, wherein the network interface is one of a WiFi access point or a wireless base station.

58. The computer-based system of claim 41, wherein the locator engine is configured to determine the first location based on a global positioning system (GPS) measurement.

59. The computer-based system of claim 41, wherein the locator engine is configured to determine the first location based on triangulation from multiple network interfaces.

60. The computer-based system of claim 41, wherein the device is one of a portable media player, a personal computer, a tablet computer, an internet-connected television, a game console, or an optical disc player.

61. The computer-based system of claim 41, further comprising a processor configured to:
  provide the service to the device;
  determine an updated location associated with the device; and
  authorize continued service to the device based on the updated location of the device.

62. A computer-based system for providing a service to a device, comprising:
  a memory storing a subscriber profile, wherein the subscriber profile includes information comprising:
    a list of authorized locations, and
    a maximum number of devices that can be associated with the subscriber profile to access the service;
  a tracker configured to receive a request to access the service;
  a locator engine configured to determine identification information associated with a network interface through which the device is connected; and
  an authorization engine configured to authorize the providing of the service to the device based on the identification information and the information in the subscriber profile in response to determining that a first location associated with the device is in the list of authorized locations and that a number of devices accessing the service will not exceed the maximum number of devices.

63. The computer-based system of claim 62, wherein the identification information is a media access control (MAC) address.

64. The computer-based system of claim 62,
  wherein the tracker is further configured to:
    determine a first user associated with the request, and
    determine a second user associated with the request; and
  wherein the authorization engine is further configured to:
    compare the first user with the second user.

65. The computer-based system of claim 62, wherein the subscriber profile corresponds to a subscriber account associated with an individual user.

66. The computer-based system of claim 64, wherein the first user is an individual user, wherein the second user is a subscriber account, and wherein the authorization engine is further configured to determine that the first user matches the second user if the first user is associated with the second user.

* * * * *

UNITED STATES PATENT AND TRADEMARK OFFICE
CERTIFICATE OF CORRECTION

PATENT NO. : 8,831,563 B2
APPLICATION NO. : 13/021433
DATED : September 9, 2014
INVENTOR(S) : Martell et al.

It is certified that error appears in the above-identified patent and that said Letters Patent is hereby corrected as shown below:

In the Claims

In column 14, line 31, claim 33, replace "device based" with --device, based--.

In column 15, line 26, claim 41, replace "plurality devices" with --plurality of devices--.

Signed and Sealed this
Twenty-seventh Day of January, 2015

Michelle K. Lee
*Deputy Director of the United States Patent and Trademark Office*